US011102733B2

United States Patent
Ioffe

(10) Patent No.: US 11,102,733 B2
(45) Date of Patent: Aug. 24, 2021

(54) ABSOLUTE POWER CONTROL TOLERANCE FOR NB-IOT/MTC

(71) Applicant: Apple Inc., Cupertino, CA (US)

(72) Inventor: Anatoliy Ioffe, Beaverton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/479,549

(22) PCT Filed: May 3, 2018

(86) PCT No.: PCT/US2018/030930
§ 371 (c)(1),
(2) Date: Jul. 19, 2019

(87) PCT Pub. No.: WO2018/204678
PCT Pub. Date: Nov. 8, 2018

(65) Prior Publication Data
US 2019/0387484 A1  Dec. 19, 2019

Related U.S. Application Data

(60) Provisional application No. 62/502,532, filed on May 5, 2017.

(51) Int. Cl.
*H04W 52/36* (2009.01)
*H04W 4/70* (2018.01)
(Continued)

(52) U.S. Cl.
CPC ........... *H04W 52/367* (2013.01); *H04W 4/70* (2018.02); *H04W 4/80* (2018.02); *H04W 52/10* (2013.01);
(Continued)

(58) Field of Classification Search
CPC ....... H04W 52/367; H04W 4/70; H04W 4/80; H04W 52/10; H04W 52/16; H04W 52/50; H04W 74/0833; H04W 52/245
See application file for complete search history.

(56) References Cited

U.S. PATENT DOCUMENTS

2015/0016312 A1* 1/2015 Li .................. H04W 74/006
 370/280
2016/0044619 A1* 2/2016 Ryu ................ H04W 56/0015
 370/350

(Continued)

OTHER PUBLICATIONS

Ahn et al. U.S. Appl. No. 62/501,045, filed May 3, 2017 (Year: 2017).*

(Continued)

*Primary Examiner* — Wutchung Chu
(74) *Attorney, Agent, or Firm* — Fish & Richardson P.C.

(57) ABSTRACT

Embodiments of the present disclosure describe methods, apparatuses, storage media, and systems for delivering UE capability indication to a positioning server in a wireless communication network. A user equipment (UE) or evolved NodeB (eNB) may process and assign narrowband physical uplink shared channel (NPUSCH) resources based on a comparison between a measured narrowband reference signal received power (NRSRP) in a narrowband physical random access channel (NPRACH) transmission and at least one threshold value. Embodiments describe how to configure the NPUSCH transmission utilizing NPRACH procedure at very low receiving Signal-to Noise ratio (SNR) to alleviate negative impacts caused by less accurate NRSRP measurements and/or increased absolute power tolerance at very low receiving SNR scenarios. Other embodiments may be described and claimed.

21 Claims, 7 Drawing Sheets

(51) Int. Cl.
H04W 4/80 (2018.01)
H04W 52/10 (2009.01)
H04W 52/16 (2009.01)
H04W 74/08 (2009.01)

(52) U.S. Cl.
CPC ....... H04W 52/16 (2013.01); H04W 74/0833 (2013.01)

(56) References Cited

U.S. PATENT DOCUMENTS

| | | | | |
|---|---|---|---|---|
| 2016/0316490 | A1* | 10/2016 | Wang | H04W 74/0833 |
| 2016/0316491 | A1* | 10/2016 | Axmon | H04L 1/1812 |
| 2017/0202025 | A1* | 7/2017 | Ouchi | H04W 52/346 |
| 2017/0280481 | A1* | 9/2017 | Stern-Berkowitz | H04W 74/0833 |
| 2018/0213486 | A1* | 7/2018 | Yoo | H04W 52/248 |
| 2018/0220373 | A1* | 8/2018 | Arzelier | H04W 4/027 |
| 2018/0234984 | A1* | 8/2018 | Axmon | H04W 72/085 |
| 2018/0332566 | A1* | 11/2018 | You | H04L 1/0091 |
| 2019/0141638 | A1* | 5/2019 | Li | H04W 52/10 |
| 2019/0141639 | A1* | 5/2019 | Rahman | H04W 52/54 |
| 2019/0174378 | A1* | 6/2019 | Chang | H04W 76/27 |
| 2019/0223212 | A1* | 7/2019 | Xiao | H04W 74/008 |
| 2019/0239170 | A1* | 8/2019 | Thangarasa | H04W 52/365 |
| 2019/0246371 | A1* | 8/2019 | Hwang | H04W 72/0453 |
| 2019/0306887 | A1* | 10/2019 | Rathonyi | H04L 5/0012 |
| 2020/0037261 | A1* | 1/2020 | Ahn | H04B 17/327 |
| 2020/0178180 | A1* | 6/2020 | Zhang | H04W 52/146 |
| 2020/0196171 | A1* | 6/2020 | Thangarasa | H04W 74/0833 |
| 2020/0296765 | A1* | 9/2020 | Kim | H04W 74/0833 |

OTHER PUBLICATIONS

Thangarasa et al. U.S. Appl. No. 62/353,017, filed Jun. 21, 2016 (Year: 2016).*
International Patent Office—International Search Report and Written Opinion dated Jul. 19, 2018 from International Application No. PCT/US2018/030930, 15 pages.
3GPP, "Technical Specification Group Radio Access Network; Evolved Universal Terrestrial Radio Access (E-UTRA); Medium Access Control (MAC) protocol specification (Release 14)," 3GPP TS 36.321 V14.2.1 (Mar. 2017), LTE Advanced Pro, 106 pages.
Anritsu, "Setting of NPUSCH power for NB-IoT Test cases," 3GPP TSG-RAN5 Meeting #72, Tdoc R5-165302, Agenda Item: 5.3.17.12, Aug. 22-26, 2016, Gothenburg, Sweden, 6 pages.
Nokia et al., "On coverage level selection related matters," 3GPP TSG-RAN WG4 #81, R4-1609827, Agenda item: 8.24.2.1, Nov. 14-18, 2016, Reno, USA, 1 pages.
Huawei et al., "Revised Work Item: Narrowband IoT (NB-IoT)," 3GPP TSG RAN Meeting #72, RP-160933, Agenda Item: 10.8.2, Jun. 13-16, 2016, Busan, Korea, 10 pages.
Neul et al., "Way forward on NB-IoT absolute power tolerance," RAN4 #82, R4-1702071, Feb. 2017, 3 pages.
3GPP, "Technical Specification Group Radio Access Network; Evolved Universal Terrestrial Radio Access (E-UTRA); Physical layer procedures (Release 14)," 3GPP TS 36.213 V14.2.0 (Mar. 2017), LTE Advanced Pro, 454 pages.
3GPP, "Technical Specification Group Radio Access Network; Evolved Universal Terrestrial Radio Access (E-UTRA); Radio Resource Control (RRC); Protocol specification (Release 14)," 3GPP TS 36.331 V14.2.2 (Apr. 2017), LTE Advanced Pro, 721 pages.
3GPP, "Technical Specification Group Radio Access Network; Evolved Universal Terrestrial Radio Access (E-UTRA); Requirements for support of radio resource management (Release 14)," 3GPP TS 36.133 V14.3.0 (Mar. 2017), LTE Advanced Pro, 2387 pages.
3GPP, "Technical Specification Group Radio Access Network; Evolved Universal Terrestrial Radio Access (E-UTRA); User Equipment (UE) radio transmission and reception (Release 14)," 3GPP TS 36.101 V143.0 (Mar. 2017), LTE Advanced Pro, 1369 pages.
3GPP, "Technical Specification Group Radio Access Network; Evolved Universal Terrestrial Radio Access (E-UTRA); User Equipment (UE) procedures in idle mode (Release 14)," 3GPP TS 36.304 V14.2.0 (Mar. 2017), 49 pages.
Neul et al., "CR for NB-IoT Absolute power tolerance," 3GPP TSG-RAN WG4 Meeting #82bis, R4-1703738, Change Request, 36.101, CR 4355, current version 13.7.0, Apr. 3-7, 2017, Spokane, WA, 2 pages.
Intel Corporation, "On measurement accuracy for NB-IoT," 3GPP RAN4 #80, R4-165057, Agenda item: 6.7.3.1, Aug. 22-26, 2016, Gothenburg, Sweden, 4 pages.
Intel Corporation, "On absolute power control accuracy requirement for NB-IoT," 3GPP TSG-RAN WG4 Meeting #83, R4-1704671, Agenda item: 5.5.1, May 15-19, 2017, Hangzhou, China, 6 pages.
Huawei et al., "NB-IoT Absolute power tolerance," 3GPP TSG-RAN WG4 Meeting #82, R4-1701265, Agenda Item: 5.5.2, Feb. 13-17, 2017, Athens, Greece, 3 pages.
PCT International Preliminary Report on Patentability in International Appln. No. PCT/US2018/030930, dated Nov. 14, 2019, 9 pages.

* cited by examiner

US 11,102,733 B2

ABSOLUTE POWER CONTROL TOLERANCE FOR NB-IOT/MTC

CROSS REFERENCE TO RELATED APPLICATION

The present application is a national phase entry under 35 U.S.C. § 371 of International Application No. PCT/US2018/030930, filed May 3, 2018, entitled "ABSOLUTE POWER CONTROL TOLERANCE FOR NB-IOT/MTC," which claims priority to U.S. Provisional Patent Application No. 62/502,532, filed May 5, 2017, entitled "Absolute power control tolerance for NB-IoT/MTC," the entire disclosures of which are hereby incorporated by reference.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In some wireless networks, when a user equipment (UE) operates at lower signal-to-noise ratio (SNR)/signal-to-noise-plus-interference ratio (SINR), for example, below −6 dB, the UE may suffer additional inaccuracy in reference signal measurements. New configurations are needed to alleviate UE uplink (UL) transmission issues caused by UE inaccuracies at lower SNR/SINR.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
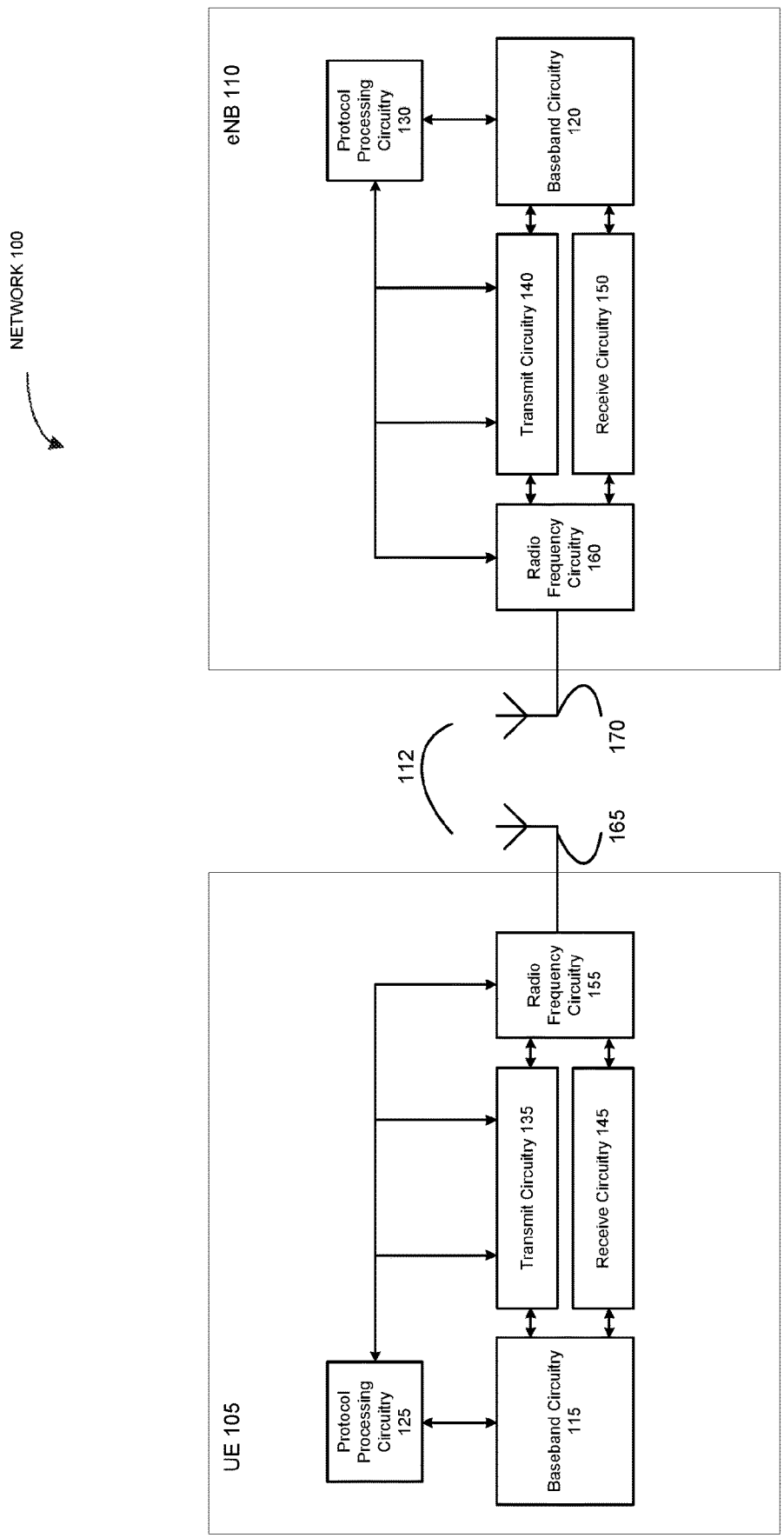
FIG. 1 schematically illustrates an example of a network comprising a UE and an evolved Node B (eNB) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA) an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

In embodiments, apparatuses, methods, and storage media may be described for configuring a UE output power for a narrowband UL transmission when the UE may experience inaccurate reference signal measurements in a wireless communication network. Newly introduced narrowband (NB) UE categories (for example, NB Internet-of-Things (NB-IoT), machine type communication (MTC), etc.) may have a UE operating under lower SINR conditions, especially in coverage enhancement (CE) mode. For example, a UE may transmit its output power with relaxed absolute power tolerance under the conditions of SINR below −6 dB, according to technical specifications (TS) prescribing Long Term Evolution (LTE) communications. (3GPP, TS 36.101, v14.3.0, Mar. 28, 2017). Absolute power tolerance defines the ability of a UE transmitter to set its initial output power to a specific value for the first subframe at the start of a contiguous or non-contiguous transmission with a transmission gap larger than 20 ms. A relaxed absolute power tolerance may cause the UE transmission power level to exceed a range of 26 dB, which is about 8 dB worse than the situation during "SINR above −6 dB" operation. Meanwhile, the narrowband reference signal received power (NRSRP) accuracy requirement may be relaxed because a UE may suffer increased measurement inaccuracy when SINR is lower, for example, below −6 dB, according to TS 36.133. (3GPP, TS 36.133, v14.3.0, Mar. 28, 2017). Such less accurate NRSRP measurements may lead to an inaccurate configuration for UE transmit power, such as an NPUSCH power level, which may conventionally be initiated in an open-loop power-control procedure coupled with a narrowband physical random access channel (NPRACH) procedure. All the above mentioned issues may negatively impact UE power efficiency and network resource efficiency for NB-IoT/MTC UEs operating in CE mode. Embodiments herein may utilize NPRACH resource selection criterion to determine an NPUSCH transmission, which may alleviate the impacts to UE and network efficiency caused by NRSRP measurement inaccuracy and increased absolute power tolerance.

It is worth noting that SNR compares the power level of a desired signal to the power level of background noise, while SINR refers to a ratio of the power level of a desired signal to the sum of the interference power and the power of background noise, or all the undesired power. An interference power from other signals may be defined as noise as well. Both SNR and SINR are used interchangably herein to refer to a ratio of the power level of the desired signal to the sum of all the undesired interference and noise.

FIG. 1 schematically illustrates an example wireless network 100 (hereinafter "network 100") in accordance with various embodiments herein. The network 100 may include a UE 105 wirelessly communicated with one eNB 110. In some embodiments, the network 100 may be a radio access network (RAN) of a third generation partnership project (3GPP) LTE network, such as an evolved universal terrestrial radio access network (E-UTRAN), a NextGen RAN (NG RAN), or some other type of RAN. The UE 105 may be configured to connect, for example, to be communicatively coupled, with the eNB 110. In this example, the connection 112 is illustrated as an air interface to enable communicative coupling, and can be consistent with cellular communications protocols such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, or any computing device including a wireless communications interface. In some embodiments, the UE 105 can comprise a narrowband Internet of Things (NB-IoT) UE, which can comprise a network access layer designed for low-power NB-IoT applications utilizing short-lived UE connections. An NB-IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The eNB 110 can enable or terminate the connection 112. The eNB 110 can be referred to as a base station (BS), NodeB, evolved NodeB (eNB), next Generation NodeB (gNB), RAN node, serving cell, and so forth, and can comprise ground stations (for example, terrestrial access points) or satellite stations providing coverage within a geographic area (for example, a cell).

The eNB 110 can be the first point of contact for the UE 105. In some embodiments, the eNB 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from any of the RAN nodes, for example, the eNB 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and H-ARQ (Hybrid Automatic Repeat Request) information related to the uplink shared channel. Typically, downlink scheduling (assigning control and shared channel resource blocks to the UE 105 within a cell) may be performed at the eNB 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

Figure 2:
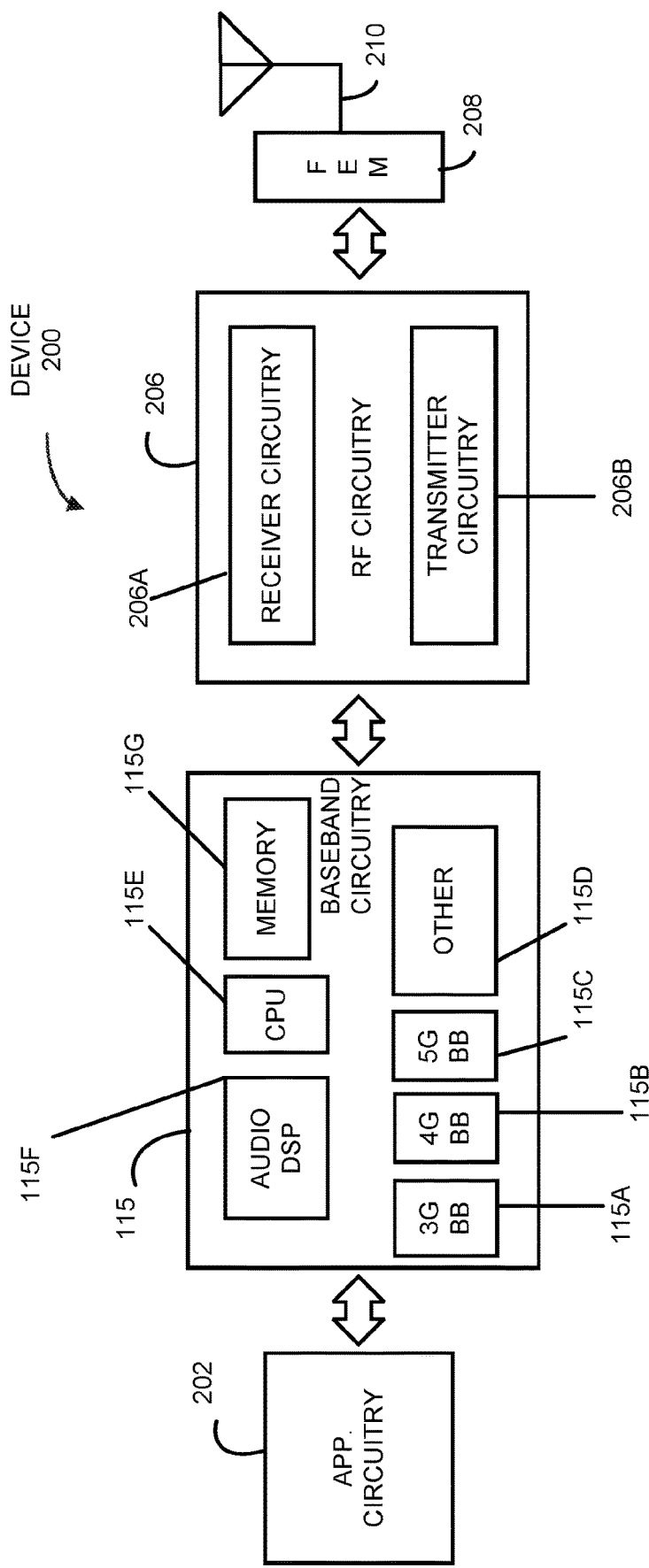
FIG. 2 illustrates example components of a device in accordance with various embodiments.
Figure 6:
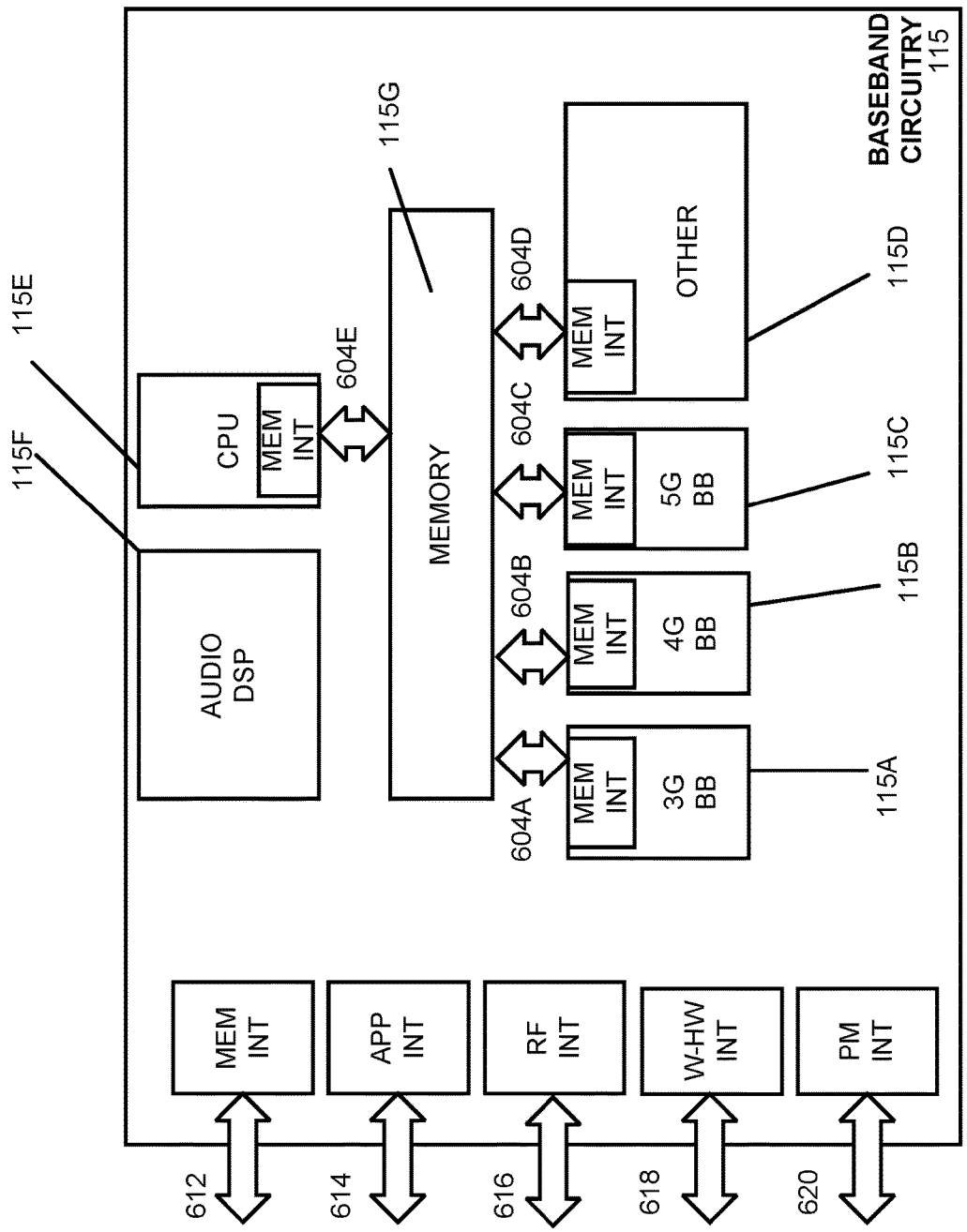
FIG. 6 illustrates example interfaces of baseband circuitry in accordance with some embodiments.

As shown in FIG. 1, the UE 105 may include baseband circuitry 115 coupled with protocol processing circuitry 125. The baseband circuitry 115 may be connected with both transmit circuitry 135 and receive circuitry 145, which are further connected to radio frequency (RF) circuitry 155 and front-end antenna 165. The baseband circuitry 115, coupled with the receive circuitry 145 and the RF circuitry 155, may receive and process a reference signal measurement in order to configure a UE transmit output power level. A UE transmission may be generated and transmitted by and via some or all of the baseband circuitry 115, the protocol processing circuitry 125, the transmit circuitry 135, the RF circuitry 155, and the front-end antenna 165. Further details regarding the UE 105 architecture is illustrated in FIGS. 2 and 6. In some embodiments, the baseband circuitry 115 may contain both the transmit circuitry 135 and the receive circuitry 145. In other embodiments, the baseband circuitry 115 may be implemented in separate chips or modules, for example, one chip including the transmit circuitry 135 and another chip including the receive circuitry 145.

Similar to the UE 105, the eNB 110 may include baseband circuitry 120 coupled with protocol processing circuitry 130. The baseband circuitry 120 may be connected with both transmit circuitry 140 and receive circuitry 150, which are further connected to RF circuitry 160 and front-end antenna 170. The baseband circuitry 120 may process received signals from the UE 105 and assign the UE 105 with transmission resources in accordance.

FIG. 2 illustrates example components of a device 200 in accordance with some embodiments. In some embodiments, the device 200 may include application circuitry 202, the baseband circuitry 115, RF circuitry 206, front-end module (FEM) circuitry 208, and one or more antennas 210 together at least as shown. The components of the illustrated device 200 may be included in a UE or an eNB. In some embodiments, the device 200 may include fewer elements (for example, an eNB may not utilize the application circuitry 202, and instead include a processor/controller to process IP data received from an evolved packet core (EPC)). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 115 may include circuitry such as, but not limited to, one or more single-core or multi-core processors. The baseband circuitry 115 may include one or more baseband processors or control logic to process baseband signals received from a receive signal path of the RF circuitry 206 and to generate baseband signals for a transmit signal path of the RF circuitry 206. Baseband processing circuitry 115 may interface with the application circuitry 202 for generation and processing of the baseband signals and for controlling operations of the RF circuitry 206. For example, in some embodiments, the baseband circuitry 115 may include a third generation (3G) baseband processor 115A, a fourth generation (4G) baseband processor 115B, a fifth generation (5G) baseband processor 115C, or other baseband processor(s) 115D for other existing generations, generations in development or to be developed in the future (for example, second generation (2G), sixth generation (6G), etc.). The baseband circuitry 115 (for example, one or more of baseband processors 115A-D) may handle various radio control functions that enable communication with one or more radio networks via the RF circuitry 206. In other embodiments, some or all of the functionality of baseband processors 115A-D may be included in modules stored in the memory 115G and executed via a Central Processing Unit (CPU) 115E. The radio control functions may include, but are not limited to, signal modulation/demodulation, encoding/decoding, radio frequency shifting, etc. In some embodiments, modulation/demodulation circuitry of the baseband circuitry 115 may include Fast-Fourier Transform (FFT), precoding, or constellation mapping/demapping functionality. In some embodiments, encoding/decoding circuitry of the baseband circuitry 115 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 115 may include one or more audio digital signal processor(s) (DSP) 115F. The audio DSP(s) 115F may be include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 115 and the application circuitry 202 may be implemented together such as, for example, on a SOC.

In some embodiments, the baseband circuitry 115 may provide for communication compatible with one or more radio technologies. For example, in some embodiments, the baseband circuitry 115 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 115 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the FEM circuitry 208 and provide baseband signals to the baseband circuitry 115. RF circuitry 206 may also include transmitter circuitry 206B, which may include circuitry to up-convert baseband signals provided by the baseband circuitry 115 and provide RF output signals to the FEM circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 115 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

FEM circuitry 208 may include a receive signal path, which may include circuitry configured to operate on RF signals received from one or more antennas 210, amplify the received signals and provide the amplified versions of the received signals to the RF circuitry 206 for further processing. FEM circuitry 208 may also include a transmit signal path, which may include circuitry configured to amplify signals for transmission provided by the RF circuitry 206 for transmission by one or more of the one or more antennas 210. In various embodiments, the amplification through transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry 208 may include a receive signal path and a transmit signal path. The receive signal path of the FEM circuitry 208 may include an low noise amplifier (LNA) to amplify received RF signals and provide the amplified received RF signals as an output (for example, to the RF circuitry 206). The transmit signal path of the FEM circuitry 208 may include a power amplifier (PA) to amplify input RF signals (for example, provided by RF circuitry 206), and one or more filters to generate RF signals for subsequent transmission (for example, by one or more of the one or more antennas 210).

Processors of the application circuitry 202 and processors of the baseband circuitry 115 may be used to execute elements of one or more instances of a protocol stack. For example, processors of the baseband circuitry 115, alone or in combination, may be used execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/eNB, described in further detail below.

A UE PUSCH power level may conventionally be configured in accordance with a PRACH procedure, in which an RSRP is measured by the UE. The measured RSRP is used for configuring the PRACH power level in this procedure. A narrowband UE is allowed to have NRSRP measurement accuracy within ±6 dB and ±9 dB under normal condition and extreme condition respectively for certain LTE bands while the SINR is above or equal to −6 dB. In addition, narrowband UE categories (for example, NB-IOT, MTC, etc.) allow a UE to measure narrowband RSRP (NRSRP) with relaxed accuracy limits of ±10.3 dB and ±13.3 dB under normal condition and extreme condition respectively, while the SINR is below −6 dB according to TS 36.133. A detailed illustration is shown in Table 1:

TABLE 1

Table 9.1.22.1-1: NRSRP Intra frequency absolute accuracy for UE Category NB1 for HD-FDD

| Accuracy | | Conditions | | | | |
|---|---|---|---|---|---|---|
| Normal | Extreme | | | $Io^{Note\ 1}$ range | | |
| condition | condition | Es/Iot | E-UTRA operating band | Minimum Io | | Maximum Io |
| dB | dB | dB | $groups^{Note\ 2}$ | dBm/15 kHz | $dBm/BW_{Channel}$ | $dBm/BW_{Channel}$ |
| ±6 | ±9 | ≥−6 dB | NFDD_G | [−118] | N/A | [−70] |
| ±8 | ±11 | ≥−6 dB | NFDD_G | N/A | [−70] | [−50] |
| ±10.3 | ±13.3 | ≥−15 Es/Iot ≥−6 dB | NFDD_G | [−118] | N/A | [−70] |
| ±12.3 | ±15.3 | ≥−15 Es/Iot ≥−6 dB | NFDD_G | N/A | [−70] | [−50] |

TABLE 1-continued

Table 9.1.22.5-1: NRSRP Inter frequency absolute accuracy for UE Category NB1 for HD-FDD

| Accuracy | | | Conditions | | | |
|---|---|---|---|---|---|---|
| Normal condition | Extreme condition | Es/Iot | E-UTRA operating band groups[Note 2] | Io[Note 1] range | | Maximum Io |
| | | | | Minimum Io | | |
| dB | dB | dB | | dBm/15 kHz | dBm/BW$_{Channel}$ | dBm/BW$_{Channel}$ |
| ±6 | ±9 | ≥−6 dB | NFDD_G | [−118] | N/A | [−70] |
| ±8 | ±11 | ≥−6 dB | NFDD_G | N/A | [−70] | [−50] |
| ±10.3 | ±13.3 | ≥−15 Es/Iot ≥−6 dB | NFDD_G | [−118] | N/A | [−70] |
| ±12.3 | ±15.3 | ≥−15 Es/Iot ≥−6 dB | NFDD_G | N/A | [−70] | [−50] |

[Note 1] Io is assumed to have constant EPRE across the bandwidth.
[Note 2] E-UTRA operating band groups are as defined in Section 3.5.

Figure 3:
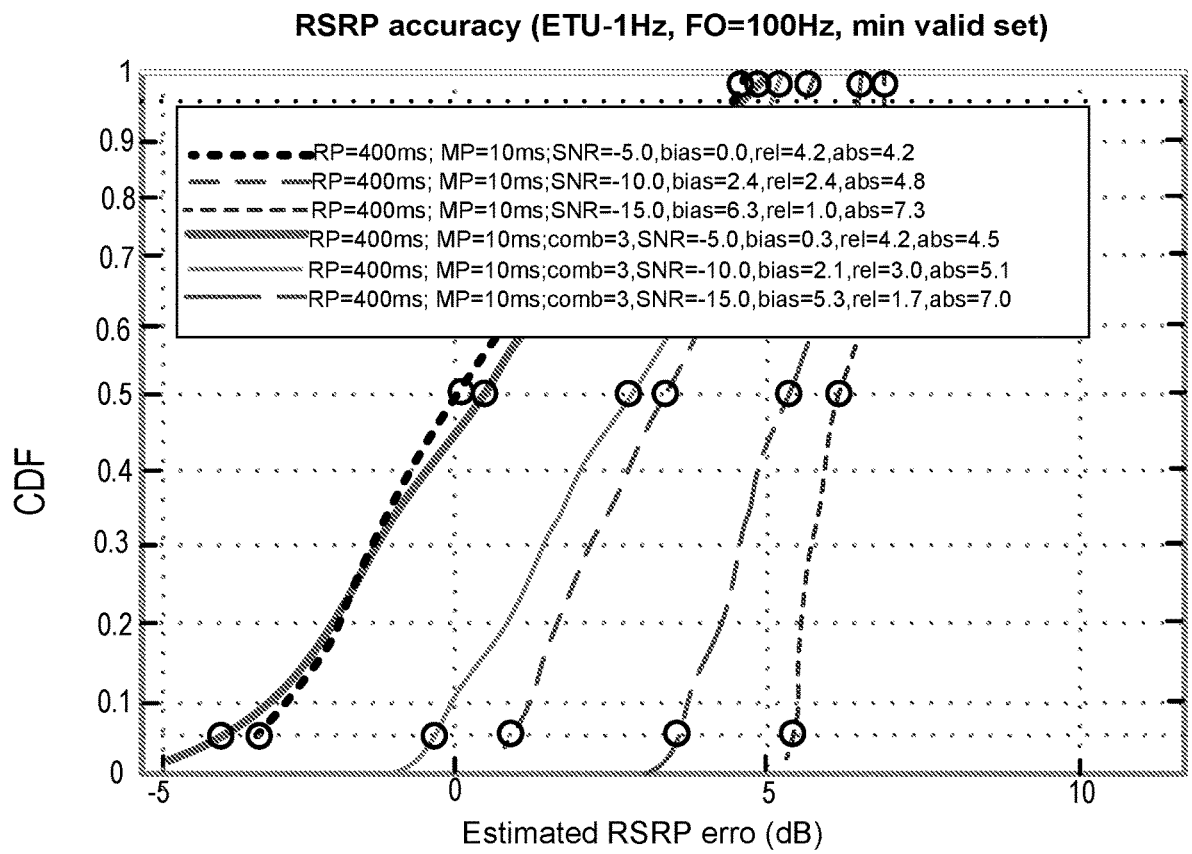
FIG. 3 illustrates reference signal received power (RSRP) accuracy simulation results under different propagation conditions and assumptions about the RSRP estimator algorithm.

FIG. 3 further shows RSRP accuracy simulation results under different propagation conditions and assumptions regarding an RSRP estimator algorithm. An elected set of results shows that the RSRP estimator bias increases when SNR decreases. Because the RSRP distribution is not zero-mean or near zero-mean any longer once SNR is below −6 dB, an RSRP's role to the selection of the UE's transmit power should be analyzed. The definition of power control for NB-IoT is given in Clause 16.2 of TS 36.213 (3GPP, TS 36.213, v14.2.0, Mar. 23, 2017). Clause 16.2 provides the following requirement:

If the number of repetitions of the allocated NPUSCH RUs is greater than 2

$$P_{NPUSCH,c}(i) = P_{CMAX,c}(I) \text{ [dBm]}$$

otherwise $$P_{NPUSCH,c}(i) = \min\begin{Bmatrix} P_{CMAX,c}(i), \\ 10\log_{10}(M_{NPUSCH,c}(I)) + P_{O\_NPUSCH,c}(j) + \alpha_c(j) \cdot PL_c \end{Bmatrix} \text{[dBm]}$$

Thus, when a UE is operating in enhanced coverage (SNR<−6 dB) and undergoes random access procedures with the network, the UE is not likely to be scheduled for NPUSCH with a repetition level (RL) equal to 2 or 1. Rather, the UE may be scheduled with a higher repetition level, which may also require the UE to transmit at its configured maximum power level, $P_{CMAX}$.

In scenarios of very low SNR, for example, SNR is approaching −15 dB, a large positive bias in the NRSRP estimate may imply that the UE's estimate of NRSRP is higher than the actual value by up to 5 dB, at least according to some analysis shown in FIG. 3. If the UE has overestimated NRSRP, then it may underestimate a path loss to the eNB. Such an underestimated path loss may result in configuring a lower-than-necessary NPUSCH power level, which may prevent the eNB from decoding the NPUSCH successfully, thereby resulting in a transmission failure.

In addition, newly introduced narrowband UE categories (for example, NB-IOT, MTC, etc.) may allow a UE to have relaxed absolute power tolerance for UE transmit power. For example, a UE is required to transmit output power with absolute power tolerance of ±9 dB and ±12 dB under normal condition and extreme condition respectively while SNR is above −6 dB. But once SNR falls into the range from −15 dB to −6 dB, relaxed absolute power tolerance may be used for UE transmit power to accommodate the difficulties caused by the very low SNR in CE mode.

Thus, such less accurate NRSRP measurements and increased absolute power tolerance may lead to an inaccurate configuration for NPUSCH transmit power, as well as NPUSCH repetition level, which may cause UE power consumption inefficiency and network resource inefficiency for NB-IoT/MTC UEs operating in CE mode.

Embodiments may utilize narrowband physical random access channel (NPRACH) resource selection criterion to assign NPUSCH transmission, which may alleviate the negative impacts on UE and network efficiency caused by increased NRSRP measurement inaccuracy and UE absolute power tolerance when operating at lower SNR/SINR.

The NB-IoT specification defines NRSRP thresholds, which are used by the UE to select the NPRACH resources. In TS 36.331 (3GPP, TS 36.331, v 14.2.2, Apr. 20, 2017), the NPRACH-ConfigSIB-NB field is defined as:

rsrp-ThresholdsPrachInfoList
  The criterion for UEs to select a NPRACH resource. Up to 2 RSPR threshold values can be signalled. The first element corresponds to RSRP threshold 1, the second element corresponds to RSRP threshold 2. See TS 36.321 [6]. If absent, there is only one NPRACH resource.

Clause 16.3.1 of 3GPP TS 36.213 specifies the following NPRACH power level selection:
The following steps are required for the L1 random access procedure:
  Layer 1 procedure is triggered upon request of a narrowband preamble transmission by higher layers.
  A target narrowband preamble received power (NARROWBAND_PREAMBLE_RECEIVED_TARGET_POWER), a corresponding RA-RNTI and an NPRACH resource are indicated by higher layers as part of the request.
  For the lowest configured repetition level, a narrowband preamble transmission power $P_{NPRACH}$ is determined as $P_{NPRACH}=\min\{P_{CMAX,c}(i), \text{NARROWBAND\_PREAMBLE\_RECEIVED\_TARGET\_POWER}+PL_c\}$ [dBm], where $P_{CMAX,c}(i)$ is the configured UE transmit power for narrowband IoT transmission defined in [6] for subframe i of serving cell c and $PL_c$ is the downlink path loss estimate calculated in the UE for serving cell
c. For a repetition level other than the lowest configured repetition level, $P_{NPRACH}$ is set to $C_{MAX,c}$ (i)

The narrowband preamble is transmitted with transmission power $P_{NPRACH}$ commencing on the indicated NPRACH resource. The narrowband preamble is transmitted for the number of NPRACH repetitions for the associated NPRACH repetition level as indicated by higher layers.

In an NPRACH transmission, NRSRP thresholds are employed to require the UE 105 to utilize $P_{CMAX}$ for all but the lowest configured repetition level. Once the UE 105 performs the NPRACH procedure, the eNB 110 may have knowledge about which NPRACH resource is used and can infer whether the UE uses the lowest set of RL, which allows the UE to utilize open-loop power-control for NPRACH or higher sets of RL, which require the UE 105 to transmit at $P_{CMAX}$. In some embodiments, the network can use this information in assigning the NPUSCH resources, including NPUSCH RL.

In some embodiments, upon completing the NPRACH procedures, the eNB 110 may be informed whether the UE can use open-loop power-control or $P_{CMAX}$ for its NPRACH transmission. The eNB 110 can then assign NPUSCH resources, including NPUSCH RL, and the eNB 110 may not select RL≤2 for the UE 105 which requires an NPRACH resource with $P_{NPRACH}=P_{CMAX}$. Further relationship between NPRACH and NPUSCH procedures may be recognized and utilized.

Figure 4:
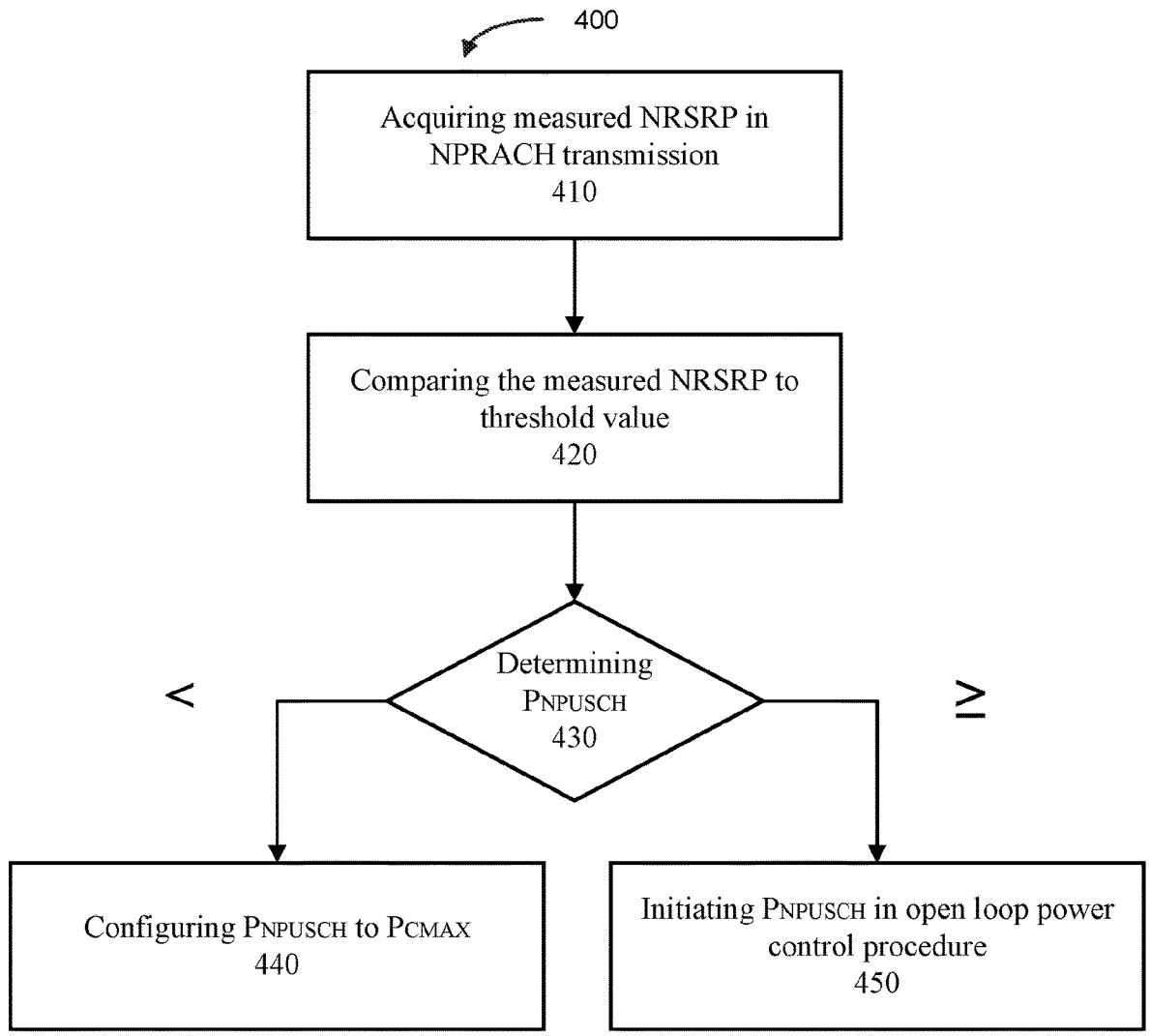
FIG. 4 illustrates an operation flow/algorithmic structure to configure a narrowband physical uplink shared channel (NPUSCH) transmission from a UE perspective, in accordance with some embodiments.

FIG. 4 illustrates an operation flow/algorithmic structure 400 to determine a power level for an NPUSCH transmission by the UE 105 in accordance with some embodiments. The operation flow/algorithmic structure 400 may be performed by the UE 105 or circuitry thereof (for example, baseband circuitry 115).

The operation flow/algorithmic structure 400 may include, at 410, acquiring a measured NRSRP of an NPRACH transmission. In some embodiments, the UE 105 may measure such NRSRP in the NPRACH procedure.

The operation flow/algorithmic structure 400 may further include, at 420, comparing the measured NRSRP of the NPRACH transmission to at least one threshold value. In some embodiments, such a threshold value may be the same as the NRSRP threshold value in the NPRACH procedure for selecting the NPRACH resources. For example, TS 36.331 indicates such NPRACH NRSRP threshold values in an rsrp-ThresholdsPrachInfoList information element (IE) in the NPRACH-ConfigSIB-NB field. In some other embodiments, the threshold value may be derived from the NRSRP threshold values defined in the NPRACH-ConfigSIB-NB field, in which an explicit link of power level selection between NPRACH and NPUSCH may be further addressed. In some embodiments, a new signaling may be introduced to facilitate the threshold value(s) for configuring NPUSCH power level as well as repetition level.

The operation flow/algorithmic structure 400 may further include, at 430, determining power level of an NPUSCH transmission. In some embodiments, this determination may be based on the comparison results between the measured NRSRP of the NPRACH transmission and the threshold value. In some other embodiments, the determination may include determining whether a $P_{CMAX}$ would be used or an open-loop power-control procedure would be used. The determination may further include electing or utilizing a repetition level for the NPUSCH transmission.

The operation flow/algorithmic structure 400 may further include, at 440, configuring $P_{NPUSCH}$ to be $P_{CMAX}$, if the measured NRSRP is smaller than the threshold value. In some embodiments, a repetition level may also be configured accordingly.

The operation flow/algorithmic structure 400 may further include, at 450, initiating $P_{NPUSCH}$ in an open-loop power-control procedure. In some embodiments, the NPUSCH power level may depend on estimate of a downlink (DL) path-loss and channel configuration in the open-loop power-control procedure. In some embodiments, a repetition level may also be configured accordingly.

Figure 5:
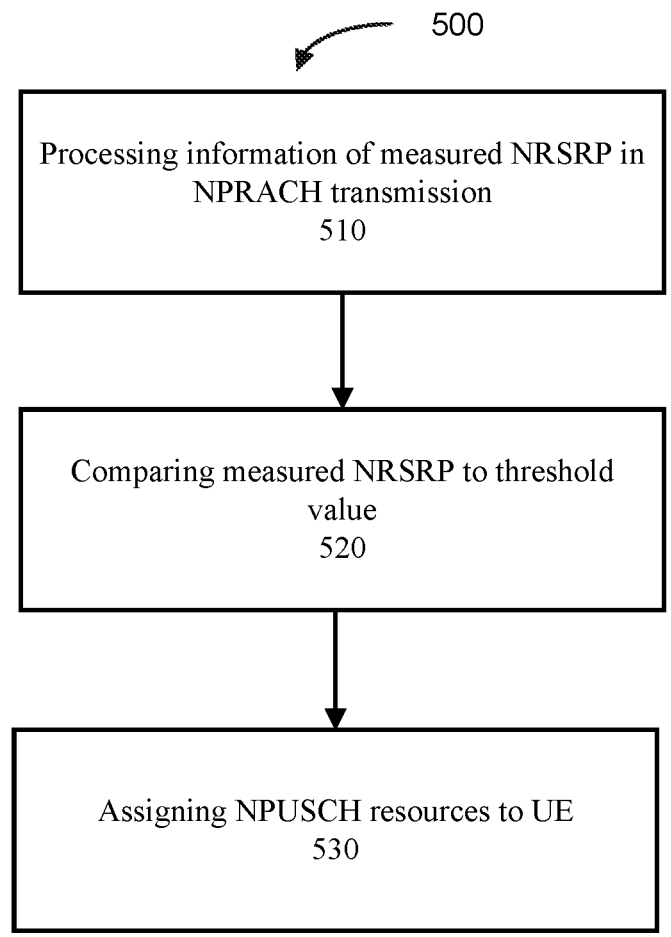
FIG. 5 illustrates an operation flow/algorithmic structure to configure a narrowband physical uplink shared channel (NPUSCH) transmission from an eNB perspective, in accordance with some embodiments.

FIG. 5 illustrates an operation flow/algorithmic structure 500 to facilitate a process of configuring the NPUSCH transmission in accordance with some embodiments. The operation flow/algorithmic structure 500 may be performed by the eNB 110 or circuitry thereof.

The operation flow/algorithmic structure 500 may include, at 510, processing information of the measured NRSRP in an NPRACH transmission. In some embodiments, the information of the measured NRSRP in an NPRACH transmission may include the measured NRSRP transmitted by the UE 105. In some other embodiments, the information of the measured NRSRP in an NPRACH transmission may indicate the comparison results of the measured NRSRP and the threshold value.

The operation flow/algorithmic structure 500 may further include, at 520, comparing the measured NRSRP to the threshold value. The measured NRSRP may be included in or indicated by the information transmitted by the UE 105 to the eNB 110. In some embodiments, the threshold value may be the same as the NRSRP threshold value in the NPRACH procedure for selecting the NPRACH resources. For example, TS 36.331 defines such NRSRP threshold values in the NPRACH-ConfigSIB-NB field as described above. In some other embodiments, the threshold value may be derived from the NRSRP threshold values defined in the NPRACH-ConfigSIB-NB field.

The operation flow/algorithmic structure 500 may further include, at 530, assigning NPUSCH resources to the UE 105. The NPUSCH resources may include, but are not limited to, a repetition level of the NPUSCH, a bandwidth of the NPUSCH, a carrier frequency of the NPUSCH, and a power level of the NPUSCH.

In some embodiments, unequal tolerance limits to absolute power tolerance may be used to alleviate the increased NRSRP bias when SINR is below −6 dB. As discussed earlier, the NRSRP bias tends to positively increase at lower SINR, which may cause the measured NRSRP be overestimated. Therefore, unequal tolerance limits, especially larger tolerance on the plus side may be beneficial. For example, absolute power tolerance limits could be implemented to +12/−9 dB when SINR is in a range of −15 to −6 dB.

All the above described embodiments may be applicable to the enhanced MTC (eMTC), since eMTC power control procedures are similarly implemented, thereby similar UE power efficiency and network resource efficiency may be encountered by eMTC as well.

Additional complexity may rise out of enhanced NB-IoT (eNB-IoT) and enhanced further enhanced MTC (efeMTC) UE categories, in which a UE is of Power Class 6 (PC6) having a maximum output power of 14 dBm. TS 36.304 (3GPP TS 36.304, v14.2.0, Mar. 22, 2017) defines a power class-dependent offset on the cell reselection criterion for NB-IoT:

5.2.3.2a Cell Selection Criterion for NB-IoT
The cell selection criterion S is fulfilled when:

$$Srxlev>0 \text{ AND } Squal>0$$

where $$Srxlev=Q_{rxlevmeas}-Q_{rxlevmin}-P\text{compensation}-Q\text{offset}_{temp}$$

$$Squal=Q_{qualmeas}-Q_{qualmin}-Q\text{offset}_{temp}$$

where

| | |
|---|---|
| Srxlev | Cell selection RX level value (dB) |
| Squal | Cell selection quality value (dB) |
| Qoffset$_{temp}$ | Offset temporarily applied to a cell as specified in [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm) if UE is not authorized for enhanced coverage and Qoffset$_{authorization}$ is valid then Q$_{rxlevmeas}$= Q$_{qualmeas}$ + Qoffset$_{authorization}$, |
| Q$_{qualmin}$ | Minimum required quality level in the cell (dB) |
| Pcompensation | If the UE supports the additionalPmax in the NS-PmaxList-NB, if present, in SIB1-NB, SIB3-NB and SIB5-NB; max(P$_{EMAX1}$ - P$_{powerclass}$, 0) - (min(P$_{EMAX2}$, P$_{powerclass}$) - min(P$_{EMAX1}$, P$_{powerclass}$)) (dB); else; if P$_{powerclass}$ is 14 dBm; max(P$_{EMAX1}$ - (P$_{powerclass}$- Poffset), 0) (dB); else; max(P$_{EMAX1}$ - P$_{powerclass}$, 0) (dB) |
| P$_{EMAX1}$, P$_{EMAX2}$ | Maximum TX power level an UE may use when transmitting on the uplink in the cell (dBm) defined as P$_{EMAX}$ in TS 36.101 [33]. P$_{EMAX1}$ and $_{EMAX2}$ are obtained from the p-Max and the NS-PmaxList-NB respectively in SIB1-NB, SIB3-NB and SIB5-NB as specified in TS 36.331 [3]. |
| P$_{powerclass}$ | Maximum RF output power of the UE (dBm) according to the UE power class as defined in TS 36.101 [33] |

The value of P$_{offset}$ signaled in the SIB1-NB field may include:

| |
|---|
| powerClass14dBm-Offset |
| Parameter "Poffset" in TS 36.304 [4]. powerClass14dBm-Offset is only applicable for UE supporting powerClassNB-14dBm. If absent, the UE applies the (default) value of 0 dB for "Poffset" in TS 36.304 [4]. |

This offset may be used to reduce the NRSRP threshold for cell re-selection, which allows the network to avoid the situation that a PC6 UE could receive downlink transmissions and measure NRSRP successfully but could not transmit NPRACH sufficiently to the network due to inadequate power level configuration. In some embodiments, such offset may be applied in determining the threshold values for configuring the power level of the initial NPRACH and NPUSCH transmission. In some other embodiments, a network-configured power class offset may be applied in determining the threshold values to offset the NRSRP values in the rsrp-ThresholdsPrachInfoList IE to enable the PC6 UE to adequately configure the power level of the initial NPRACH and NPUSCH transmission.

FIG. 6 illustrates example interfaces of baseband circuitry in accordance with some embodiments. As discussed above, the baseband circuitry 115 of FIGS. 1 and 2 may comprise processors 115A-115E and a memory 115G utilized by said processors. Each of the processors 115A-115E may include a memory interface, 604A-604E, respectively, to send/receive data to/from the memory 115G.

The baseband circuitry 115 may further include one or more interfaces to communicatively couple to other circuitries/devices, such as a memory interface 612 (for example, an interface to send/receive data to/from memory external to the baseband circuitry 115), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
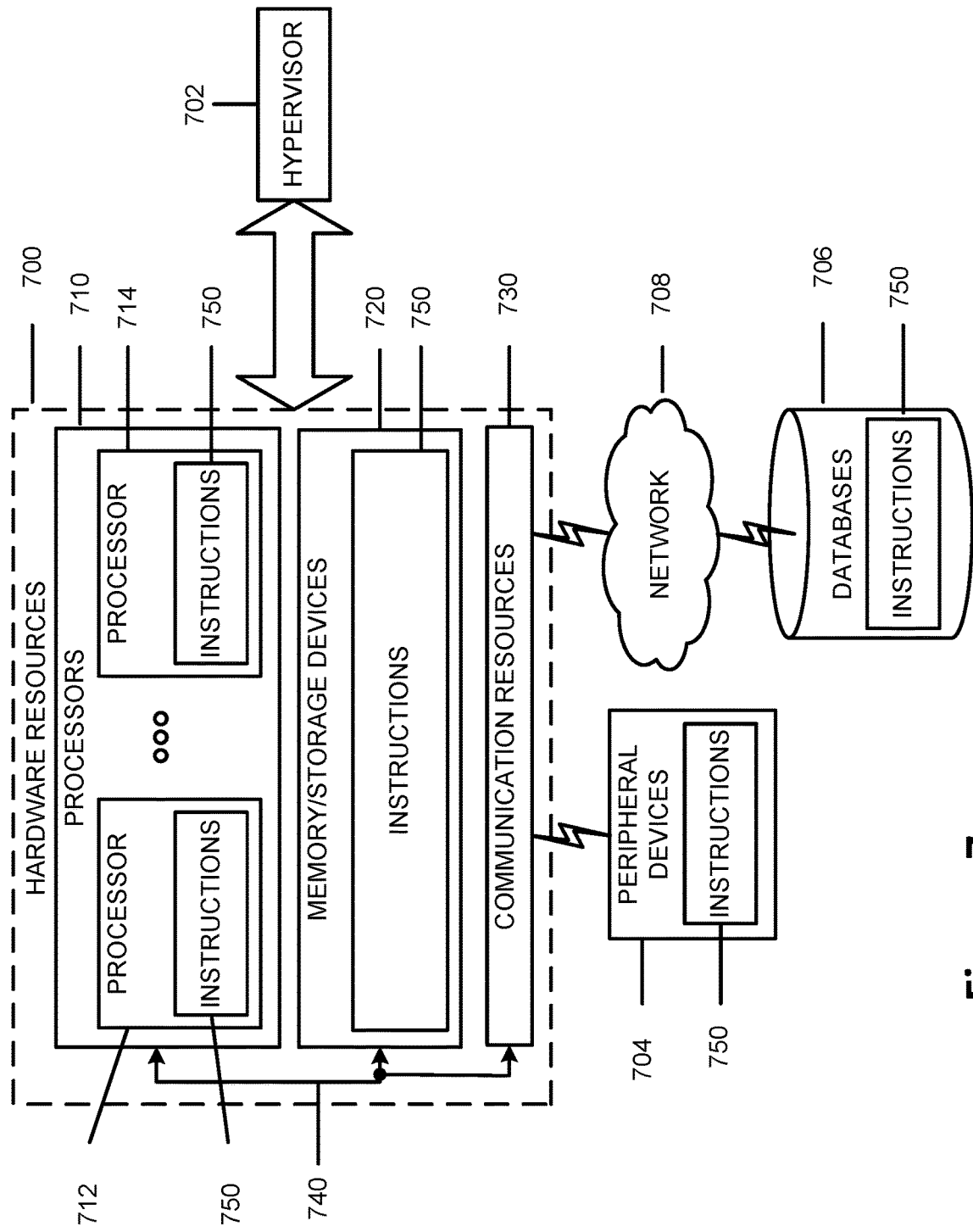
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 105, the instructions 750 may cause the UE to perform some or all of the operation flow/algorithmic structure 400. In other embodiments, the hardware resources 700 may be implemented into the eNB 110. The instructions 750 may cause the eNB 110 to perform some or all of the operation flow/algorithmic structure 500. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more computer-readable media comprising instructions to, upon execution of the instructions by one or more processors of a user equipment (UE), cause the UE to: acquire a measured NRSRP in an NPRACH transmission; compare the measured NRSRP to at least one threshold value; and determine, based on the comparison between the measured NRSRP and the at least one threshold value, a power level for an NPUSCH transmission.

Example 2 may include the one or more computer-readable media of example 1 and/or some other example herein, wherein upon execution, the instructions are to further cause the UE to process a transmission from an eNB to determine the at least one threshold value, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 3 may include the one or more computer-readable media of example 1 and/or some other example herein, wherein upon execution, the instructions are to further cause the UE to process a signal that is transmitted by an eNB to determine the at least one threshold value for configuring the NPUSCH transmission, wherein the signal includes information to indicate the at least one threshold value, further wherein the information to indicate the at least one threshold value corresponds to at least one NPRACH NRSRP threshold value that is used for NPRACH resources selection.

Example 4 may include the one or more computer-readable media of example 1 and/or some other example herein, wherein, upon execution, the instructions are to further cause the UE to utilize, based on the comparison between the measured NRSRP and the at least one threshold value, a repetition level for the NPUSCH transmission.

Example 5 may include the one or more computer-readable media of example 1 and/or some other example herein, wherein the power level for the NPUSCH transmission is a configured maximum UE output power ($P_{cmax}$), under a condition that the measured NRSRP is smaller than the at least one threshold value.

Example 6 may include the one or more computer-readable media of example 1 and/or some other example herein, wherein the power level for the NPUSCH transmission is configured to be initialized in an open-loop power control process, under a condition that the measured NRSRP is equal to or larger than the at least one threshold value.

Example 7 may include the one or more computer-readable media of example 1 and/or some other example herein, wherein unequal absolute power tolerance limits are implemented for the NPUSCH transmission.

Example 8 may include the one or more computer-readable media of example 1 and/or some other example herein, wherein, upon execution, the instructions are to further cause the UE to generate a message, to be transmitted to the eNB, to include information to indicate the measured NRSRP.

Example 9 may include the one or more computer-readable media of examples 1-8 and/or some other example herein, wherein the UE is in a UE category of NB-IoT or MTC.

Example 10 may include the one or more computer-readable media of example 1 and/or some other example herein, wherein the at least one threshold value is reduced by a power offset when the UE is a PC6 UE.

Example 11 may include the one or more computer-readable media of example 10 and/or some other example herein, wherein, upon execution, the instructions are to further cause the UE to process an SIB1-NB message that includes a PC6 power offset IE (powerClass14 dBm-Offset) to determine the power offset.

Example 12 may include the one or more computer-readable media of examples 10-11 and/or some other example herein, wherein the UE is in a UE category of eNB-IoT, further enhanced NB-IoT (FeNB-IoT), eMTC, or further enhanced MTC (FeMTC).

Example 13 may include the one or more computer-readable media of examples 1-8 and 10-11 and/or some other example herein, wherein the measured NRSRP is measured under a condition that a downlink (DL) signal-to-noise ratio (SNR) is below −6 dB.

Example 14 may include one or more computer-readable media comprising instructions to, upon execution of the instructions by one or more processors of an eNB, cause the eNB to: process a transmission, received from a UE, to determine an indication of a measured NRSRP in an NPRACH transmission; compare the measured NRSRP to at least one threshold value; and assign, based on the comparison between the measured NRSRP and the threshold value, NPUSCH resources to the UE.

Example 15 may include the one or more computer-readable media of example 14 and/or some other example herein, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 16 may include the one or more computer-readable media of example 14 and/or some other example herein, wherein to assign NPUSCH resources, the eNB is to assign a power level for an NPUSCH transmission.

Example 17 may include the one or more computer-readable media of example 16 and/or some other example herein, wherein the power level for the NPUSCH transmission is a configured maximum UE output power ($P_{cmax}$) or is configured in an open-loop power control process.

Example 18 may include the one or more computer-readable media of example 14 and/or some other example herein, wherein to assign the NPUSCH resources, the eNB is to assign a repetition level for an NPUSCH transmission.

Example 19 may include the one or more computer-readable media of example 14 and/or some other example herein, wherein to assign the NPUSCH resources, the eNB is to assign a bandwidth for an NPUSCH transmission.

Example 20 may include the one or more computer-readable media of example 14-19 and/or some other example herein, wherein the measured NRSRP is measured under a condition that a downlink (DL) signal-to-noise ratio (SNR) is below −6 dB.

Example 21 may include an apparatus of baseband circuitry in a user equipment (UE), comprising: one or more baseband processors to acquire a measured NRSRP in an NPRACH transmission; and a CPU coupled with the one or more baseband processors, the CPU to compare the measured NRSRP to at least one threshold value, and generate, based on the comparison between the measured NRSRP and the at least one threshold value, a configuration to indicate a power level for an NPUSCH transmission.

Example 22 may include the apparatus of example 21 and/or some other example herein, wherein the CPU is further to determine the at least one threshold value, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 23 may include the apparatus of example 21 and/or some other example herein, wherein the one or more baseband processors are further to process a signal that is transmitted by an eNB to determine the at least one threshold value for configuring the NPUSCH transmission, wherein the signal includes information to indicate the at least one threshold value, further wherein the information to indicate the at least one threshold value corresponds to at least one NPRACH NRSRP threshold value that is used for NPRACH resources selection.

Example 24 may include the apparatus of example 21 and/or some other example herein, wherein the configuration is further to indicate a repetition level for the NPUSCH transmission.

Example 25 may include the apparatus of example 21 and/or some other example herein, wherein the power level for the NPUSCH transmission is a configured maximum UE output power ($P_{cmax}$), under a condition that the measured NRSRP is smaller than the at least one threshold value.

Example 26 may include the apparatus of example 21 and/or some other example herein, wherein the power level for the NPUSCH transmission is configured to be initialized in an open-loop power control process, under a condition that the measured NRSRP is equal to or larger than the at least one threshold value.

Example 27 may include the apparatus of example 21 and/or some other example herein, wherein unequal absolute power tolerance limits are implemented for the NPUSCH transmission, further wherein a plus end absolute power tolerance limit is larger than a minors end absolute power tolerance limit.

Example 28 may include the apparatus of example 21 and/or some other example herein, wherein the one or more baseband processors are further to generate a message, to be transmitted to an eNB, to include information to indicate the measured NRSRP.

Example 29 may include the apparatus of examples 21-28 and/or some other example herein, wherein the UE is in a UE category of NB-IoT or MTC.

Example 30 may include the apparatus of example 21 and/or some other example herein, wherein the at least one threshold value is reduced by a power offset when the UE is a PC6 UE.

Example 31 may include the apparatus of example 30 and/or some other example herein, wherein the one or more baseband processors are further to process an SIB1-NB message that includes a PC6 power offset IE (powerClass14 dBm-Offset) to determine the power offset.

Example 32 may include the apparatus of examples 30-31 and/or some other example herein, wherein the UE is in a UE category of eNB-IoT, FeNB-IoT, eMTC, or FeMTC.

Example 33 may include the apparatus of examples 21-28 and 30-31 and/or some other example herein, wherein the measured NRSRP is measured under a condition that a downlink (DL) signal-to-noise ratio (SNR) is below −6 dB.

Example 34 may include an apparatus of baseband circuitry of an eNB, comprising: one or more baseband processors to process an NPRACH transmission, received from a UE, to determine an indication of a measured NRSRP in the NPRACH transmission; and a CPU coupled with the one or more baseband processors, the CPU to compare the measured NRSRP to at least one threshold value, and assign, based on the comparison between the measured NRSRP and the threshold value, NPUSCH resources to the UE.

Example 35 may include the apparatus of example 34 and/or some other example herein, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 36 may include the apparatus of example 34 and/or some other example herein, wherein for the CPU to assign NPUSCH resources, the CPU is to assign a power level for an NPUSCH transmission.

Example 37 may include the apparatus of example 36 and/or some other example herein, wherein the power level for the NPUSCH transmission is a configured maximum UE output power ($P_{cmax}$) or is configured in an open-loop power control process.

Example 38 may include the apparatus of example 34 and/or some other example herein, wherein for the CPU to assign the NPUSCH resources, the CPU is to assign a repetition level for an NPUSCH transmission.

Example 39 may include the apparatus of example 34 and/or some other example herein, wherein for the CPU to assign the NPUSCH resources, the CPU is to assign a bandwidth for an NPUSCH transmission.

Example 40 may include the apparatus of examples 34-39 and/or some other example herein, wherein the measured NRSRP is measured under a condition that a downlink (DL) signal-to-noise ratio (SNR) is below −6 dB.

Example 41 may include a method, comprising: acquiring or cause to acquire a measured NRSRP in an NPRACH transmission; comparing or cause to compare the measured NRSRP to at least one threshold value; and generating or cause to generate, based on the comparison between the measured NRSRP and the at least one threshold value, a configuration to indicate a power level for an NPUSCH transmission.

Example 42 may include the method of example 41 and/or some other example herein, further comprising: determining or cause to determine the at least one threshold value, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 43 may include the method of example 41 and/or some other example herein, further comprising: processing or cause to process a signal that is transmitted by an eNB to determine the at least one threshold value for configuring the NPUSCH transmission, wherein the signal includes information to indicate the at least one threshold value, further wherein the information to indicate the at least one threshold value corresponds to at least one NPRACH NRSRP threshold value that is used for NPRACH resources selection.

Example 44 may include the method of example 41 and/or some other example herein, wherein the configuration is further to indicate a repetition level for the NPUSCH transmission.

Example 45 may include the method of example 41 and/or some other example herein, wherein the power level for the NPUSCH transmission is a configured maximum UE output power ($P_{cmax}$), under a condition that the measured NRSRP is smaller than the at least one threshold value.

Example 46 may include the method of example 41 and/or some other example herein, wherein the power level for the NPUSCH transmission is configured to be initialized in an open-loop power control process, under a condition that the measured NRSRP is equal to or larger than the at least one threshold value.

Example 47 may include the method of example 41 and/or some other example herein, wherein unequal absolute power tolerance limits are implemented for the NPUSCH transmission, further wherein a plus end absolute power tolerance limit is larger than a minors end absolute power tolerance limit.

Example 48 may include the method of example 41 and/or some other example herein, further comprising: generating or cause to generate a message, to be transmitted to an eNB, to include information to indicate the measured NRSRP.

Example 49 may include the method of examples 41-48 and/or some other example herein, wherein the method is executed by a UE and the UE is in a UE category of NB-IoT or MTC.

Example 50 may include the method of example 41 and/or some other example herein, wherein the at least one threshold value is reduced by a power offset when the method is executed by a UE and the UE is a PC6 UE.

Example 51 may include the method of example 50 and/or some other example herein, further comprising: processing or cause to process an SIB1-NB message that includes a PC6 power offset IE (powerClass14 dBm-Offset) to determine the power offset.

Example 52 may include the method of examples 50-51 and/or some other example herein, wherein the UE is in a UE category of eNB-IoT, FeNB-IoT, eMTC, or FeMTC.

Example 53 may include the method of examples 41-48 and 50-51 and/or some other example herein, wherein the measured NRSRP is measured under a condition that a downlink (DL) signal-to-noise ratio (SNR) is below −6 dB.

Example 54 may include a method, comprising: processing or cause to process a NPRACH transmission, received from a UE, to determine an indication of a measured NRSRP in an NPRACH transmission; comparing or cause to compare the measured NRSRP to at least one threshold value; and assigning or cause to assign, based on the comparison between the measured NRSRP and the threshold value, NPUSCH resources to the UE.

Example 55 may include the method of example 54 and/or some other example herein, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 56 may include the method of example 54 and/or some other example herein, wherein the assigning or cause to assign NPUSCH resources is assigning or cause to assign a power level for an NPUSCH transmission.

Example 57 may include the method of example 56 and/or some other example herein, wherein the power level for the NPUSCH transmission is a configured maximum UE output power ($P_{cmax}$) or is configured in an open-loop power control process.

Example 58 may include the method of example 54 and/or some other example herein, wherein the assigning or cause to assign NPUSCH resources is assigning or cause to assign a repetition level for an NPUSCH transmission.

Example 59 may include the method of example 54 and/or some other example herein, wherein the assigning or cause to assign NPUSCH resources is assigning or cause to assign a bandwidth for an NPUSCH transmission.

Example 60 may include the method of examples 54-59 and/or some other example herein, wherein the measured NRSRP is measured under a condition that a downlink (DL) signal-to-noise ratio (SNR) is below −6 dB.

Example 61 may include an apparatus of baseband circuitry in a user equipment (UE), comprising: acquiring means for acquiring a measured NRSRP in an NPRACH transmission; comparison means for comparing the measured NRSRP to at least one threshold value; and generation means for generating, based on the comparison between the measured NRSRP and the at least one threshold value, a configuration to indicate a power level for an NPUSCH transmission.

Example 62 may include the apparatus of example 61 and/or some other example herein, further comprising determination means for determining the at least one threshold value, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 63 may include the apparatus of example 61 and/or some other example herein, further comprising processing means for processing a signal that is transmitted by an eNB to determine the at least one threshold value for configuring the NPUSCH transmission, wherein the signal includes information to indicate the at least one threshold value, further wherein the information to indicate the at least one threshold value corresponds to at least one NPRACH NRSRP threshold value that is used for NPRACH resources selection.

Example 64 may include the apparatus of example 61 and/or some other example herein, further comprising indication means for indicating a repetition level for the NPUSCH transmission.

Example 65 may include the apparatus of example 61 and/or some other example herein, wherein the power level for the NPUSCH transmission is a configured maximum UE output power ($P_{cmax}$), under a condition that the measured NRSRP is smaller than the at least one threshold value.

Example 66 may include the apparatus of example 61 and/or some other example herein, wherein the power level for the NPUSCH transmission is configured to be initialized in an open-loop power control process, under a condition that the measured NRSRP is equal to or larger than the at least one threshold value.

Example 67 may include the apparatus of example 61 and/or some other example herein, wherein unequal absolute power tolerance limits are implemented for the NPUSCH transmission, further wherein a plus end absolute power tolerance limit is larger than a minors end absolute power tolerance limit.

Example 68 may include the apparatus of example 61 and/or some other example herein, further comprising generation means for generating a message, to be transmitted to an eNB, to include information to indicate the measured NRSRP.

Example 69 may include the apparatus of examples 61-68 and/or some other example herein, wherein the UE is in a UE category of NB-IoT or MTC.

Example 70 may include the apparatus of example 61 and/or some other example herein, wherein the at least one threshold value is reduced by a power offset when the UE is a PC6 UE.

Example 71 may include the apparatus of example 70 and/or some other example herein, further comprising processing means for processing an SIB1-NB message that includes a PC6 power offset IE (powerClass14 dBm-Offset) to determine the power offset.

Example 72 may include the apparatus of examples 70-71 and/or some other example herein, wherein the UE is in a UE category of eNB-IoT, FeNB-IoT, eMTC, or FeMTC.

Example 73 may include the apparatus of examples 61-68 and 70-71 and/or some other example herein, wherein the measured NRSRP is measured under a condition that a downlink (DL) signal-to-noise ratio (SNR) is below −6 dB.

Example 74 may include an apparatus of baseband circuitry of an eNB, comprising: processing means for processing transmission, received from a UE, to determine an indication of a measured NRSRP in an NPRACH transmission; comparison means for comparing the measured NRSRP to at least one threshold value; and assigning means for assigning, based on the comparison between the measured NRSRP and the threshold value, NPUSCH resources to the UE.

Example 75 may include the apparatus of example 74 and/or some other example herein, wherein the at least one threshold value corresponds to at least one NPRACH NRSRP threshold value that is indicated by an rerp-ThresholdsPrachInfoList IE, further wherein the rerp-ThresholdsPrachInfoList IE is incorporated in an NPRACH-ConfigSIB-NB IE that is used to select NPRACH resources for the NPRACH transmission.

Example 76 may include the apparatus of example 74 and/or some other example herein, wherein the assigning means for assigning is to assign a power level for an NPUSCH transmission.

Example 77 may include the apparatus of example 76 and/or some other example herein, wherein the power level for the NPUSCH transmission is a configured maximum UE output power ($P_{cmax}$) or is configured in an open-loop power control process.

Example 78 may include the apparatus of example 74 and/or some other example herein, wherein the assigning means for assigning the NPUSCH resources is for assigning a repetition level for the NPUSCH transmission.

Example 79 may include the apparatus of example 74 and/or some other example herein, wherein the assigning means for assigning the NPUSCH resources is for assigning a bandwidth for an NPUSCH transmission.

Example 80 may include the apparatus of examples 74-79 and/or some other example herein, wherein the measured NRSRP is measured under a condition that a downlink (DL) signal-to-noise ratio (SNR) is below −6 dB.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media comprising instructions that, upon execution by one or more processors of a user equipment (UE), cause the UE to:
   acquire a measured narrowband reference signal received power (NRSRP) in a narrowband physical random access channel (NPRACH) transmission;
   compare the measured NRSRP to at least one threshold value; and
   determine, based on the comparison between the measured NRSRP and the at least one threshold value, a power level for a narrowband physical uplink shared channel (NPUSCH) transmission, wherein determining the power level for the NPUSCH transmission comprises:

setting the power level for the NPUSCH transmission to a predetermined maximum UE output power (Pcmax) when the measured NRSRP is smaller than the at least one threshold value, and setting the power level for the NPUSCH transmission in an open loop power control process when the measured NRSRP is equal to or larger than the at least one threshold value.

2. The one or more non-transitory computer-readable media of claim 1, wherein, upon execution, the instructions are to further cause the UE to:

process a transmission from an evolved NodeB (eNB) to determine the at least one threshold value, wherein the at least one threshold value corresponds to at least one NPRACH NRSRP threshold value that is indicated by an rsrp-ThresholdsPrachInfoList information element (IE), further wherein the rsrp-ThresholdsPrachInfoList IE is incorporated in an NPRACH-ConfigSIB-NB IE that is used to select NPRACH resources for the NPRACH transmission.

3. The one or more non-transitory computer-readable media of claim 1, wherein, upon execution, the instructions are to further cause the UE to:

process a signal that is transmitted by an evolved NodeB (eNB) to determine the at least one threshold value for configuring the NPUSCH transmission, wherein the signal includes information to indicate the at least one threshold value, further wherein the information to indicate the at least one threshold value corresponds to at least one NPRACH NRSRP threshold value that is used for NPRACH resources selection.

4. The one or more non-transitory computer-readable media of claim 1, wherein, upon execution, the instructions are to further cause the UE to:

utilize, based on the comparison between the measured NRSRP and the at least one threshold value, a repetition level for the NPUSCH transmission.

5. The one or more non-transitory computer-readable media of claim 1, wherein unequal absolute power tolerance limits are implemented for the NPUSCH transmission.

6. The one or more non-transitory computer-readable media of claim 1, wherein the at least one threshold value is reduced by a power offset when the UE is a power class 6 (PC6) UE.

7. The one or more non-transitory computer-readable media of claim 6, wherein, upon execution, the instructions are to further cause the UE to process an narrowband (NB) system information block type 1 (SIB1-NB) message that includes a PC6 power offset IE (powerClassI4 dBm-Offset) to determine the power offset.

8. The one or more non-transitory computer-readable media of claim 1, wherein, upon execution, the instructions are to further cause the UE to:

generate a message, to be transmitted to an evolved NodeB (eNB), to include information to indicate the measured NRSRP.

9. The one or more non-transitory computer-readable media of claim 1, wherein the measured NRSRP is measured under a condition that a downlink (DL) signal-to-noise ratio (SNR) is below −6 dB.

10. The one or more non-transitory computer-readable media of claim 1, wherein the UE is in a UE category of NB Internet of Things (NB IoT), enhanced NB-IoT (eNB-IoT), further-enhanced NB-IoT (FeNB-IoT), machine type communication (MTC), enhanced MTC (eMTC), further enhanced MTC (FeMTC), or enhanced FeMTC (eFeMTC).

11. One or more non-transitory computer-readable media comprising instructions that, upon execution by one or more processors of an evolved NodeB (eNB), cause the eNB to:

process a transmission, received from a user equipment (UE), to determine an indication of a measured narrowband reference signal received power (NRSRP) in a narrowband physical random access channel (NPRACH) transmission;

compare the measured NRSRP to at least one threshold value; and assign, based on the comparison between the measured NRSRP and the threshold value, narrowband physical uplink shared channel (NPUSCH) resources to the UE, wherein assigning NPUSCH resources to the UE based on the comparison between the measured NRSRP and the threshold value comprises:

assigning a power level for an NPUSCH transmission by the UE to a predetermined maximum UE output power (Pcmax) when the measured NRSRP is smaller than the at least one threshold value, and assigning the power level for the NPUSCH transmission by the UE in an open loop power control process when the measured NRSRP is equal to or larger than the at least one threshold value.

12. The one or more non-transitory computer-readable media of claim 11, wherein the at least one threshold value corresponds to at least one NPRACH NRSRP threshold value that is indicated by an rsrp-ThresholdsPrachInfoList information element (IE), further wherein the rsrp-ThresholdsPrachinfoList IE is incorporated in an NPRACH-ConfigSIBNB IE that is used to select NPRACH resources for the NPRACH transmission.

13. The one or more non-transitory computer-readable media of claim 11, wherein to assign the NPUSCH resources, the eNB is to assign a repetition level for the NPUSCH transmission.

14. An apparatus of a baseband circuitry of a user equipment (UE), the apparatus comprising:

one or more baseband processors to acquire a measured narrowband reference signal received power (NRSRP) in a narrowband physical random access channel (NPRACH) transmission; and a central processing unit (CPU) coupled with the one or more baseband processors, the CPU to:

compare the measured NRSRP to at least one threshold value, and generate, based on the comparison between the measured NRSRP and the at least one threshold value, a configuration to indicate a power level for a narrowband physical uplink shared channel (NPUSCH) transmission, wherein determining the power level for the NPUSCH transmission comprises:

setting the power level for the NPUSCH transmission to a predetermined maximum UE output power (Pcmax) when the measured NRSRP is smaller than the at least one threshold value, and setting the power level for the NPUSCH transmission in an open loop power control process when the measured NRSRP is equal to or larger than the at least one threshold value.

15. The apparatus of claim 14, wherein the configuration is further to indicate, based on the comparison between the measured NRSRP and the at least one threshold value, a repetition level for the NPUSCH transmission.

16. The apparatus of claim 14, wherein the CPU is further to determine the at least one NRSRP threshold value, wherein the at least one NRSRP threshold value corresponds to at least one NPRACH NRSRP threshold value that is indicated by an rsrp-ThresholdsPrachlnfoList information element, further wherein the rsrp-ThresholdsPrachlnfoList information element is incorporated in an NPRACH-ConfigSIB-NB information element that is to select NPRACH resources for the NPRACH transmission.

17. The apparatus of claim 14, wherein unequal absolute power tolerance limits are implemented for the NPUSCH transmission, further wherein a plus end absolute power tolerance limit is larger than a minors end absolute power tolerance limit.

18. The apparatus of claim 14, wherein the one or more baseband processors are further to process a signal that is transmitted from an evolved NodeB (eNB) to determine the at least one threshold value, wherein the signal includes information to indicate the at least one threshold value, further wherein the information to indicate the at least one threshold value corresponds to at least one NPRACH NRSRP threshold value that is used for NPRACH resources selection.

19. An apparatus of a baseband circuitry of an evolved NodeB (eNB), the apparatus comprising:
    one or more baseband processors to process a narrowband physical random access channel (NPRACH) transmission, received from a user equipment (UE), to determine an indication of a measured narrowband reference signal received power (NRSRP); and
    a central processing unit (CPU) coupled with the one or more baseband processors, the CPU to:
        compare the measured NRSRP to at least one threshold value; and
        assign, based on the comparison between the measured NRSRP and the threshold value, narrowband physical uplink shared channel (NPUSCH) resources to the UE, wherein assigning NPUSCH resources to the UE based on the comparison between the measured NRSRP and the threshold value comprises:
            assigning a power level for an NPUSCH transmission by the UE to a predetermined maximum UE output power (Pcmax) when the measured NRSRP is smaller than the at least one threshold value, and
            assigning the power level for the NPUSCH transmission by the UE in an open loop power control process when the measured NRSRP is equal to or larger than the at least one threshold value.

20. The apparatus of claim 19, wherein to assign the NPUSCH resources, the CPU is to assign an output power level for an NPUSCH transmission and a repetition level for the NPUSCH transmission.

21. The apparatus of claim 19, wherein the at least one threshold value corresponds to at least one NPRACH NRSRP threshold value that is indicated by an rsrp-ThresholdsPrachlnfoList information element (IE), further wherein the rsrp-ThresholdsPrachinfoList IE is incorporated in an NPRACH-ConfigSIBNB IE that is used to select NPRACH resources for the NPRACH transmission.

* * * * *

UNITED STATES PATENT AND TRADEMARK OFFICE
CERTIFICATE OF CORRECTION

PATENT NO. : 11,102,733 B2  
APPLICATION NO. : 16/479549  
DATED : August 24, 2021  
INVENTOR(S) : Anatoliy Ioffee Page 1 of 1

It is certified that error appears in the above-identified patent and that said Letters Patent is hereby corrected as shown below:

In the Claims

Column 23, Line 49, in Claim 7, delete "(SIBI-NB)" and insert -- (SIB1-NB) --;

Column 23, Line 50, in Claim 7, delete "(powerClassI4 dBm-Offset)" and insert -- (powerClass14dBm-Offset) --;

Column 23, Line 64, in Claim 10, delete "(NB IoT)," and insert -- (NB-IoT), --;

Column 23, Line 65, in Claim 10, delete "(FeNB-loT)," and insert -- (FeNB-IoT), --;

Column 24, Line 28, in Claim 12, delete "lnfoList" and insert -- InfoList --;

Column 24, Line 30, in Claim 12, delete "PrachinfoList" and insert -- PrachInfoList --;

Column 24, Line 31, in Claim 12, delete "SIBNB" and insert -- SIB-NB --;

Column 25, Line 2, in Claim 16, delete "lnfoList" and insert -- InfoList --;

Column 25, Line 3, in Claim 16, delete "lnfoList" and insert -- InfoList --;

Column 26, Line 25, in Claim 21, delete "lnfoList" and insert -- InfoList --;

Column 26, Line 26, in Claim 21, delete "PrachinfoList" and insert -- PrachInfoList --; and Column 26, Line 27, in Claim 21, delete "SIBNB" and insert -- SIB-NB --.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*